United States Patent
Barrett et al.

(10) Patent No.: US 12,049,930 B2
(45) Date of Patent: Jul. 30, 2024

(54) CENTER SHAFT VENTED CVJ

(71) Applicant: NTN BEARING CORPORATION OF AMERICA, Mt. Prospect, IL (US)

(72) Inventors: Jon Robert Barrett, Howell, MI (US); Krystil Elizabeth Edwards, Livonia, MI (US); Jonathan Allen Boarts, Garden City, MI (US); Ryan Christopher Matheny, Northville, MI (US)

(73) Assignee: NTN BEARING CORPORATION OF AMERICA, Mt. Prospect, IL (US)

( * ) Notice: Subject to any disclaimer, the term of this patent is extended or adjusted under 35 U.S.C. 154(b) by 390 days.

(21) Appl. No.: 17/491,821

(22) Filed: Oct. 1, 2021

(65) Prior Publication Data
US 2023/0109000 A1 Apr. 6, 2023

(51) Int. Cl.
*F16D 3/84* (2006.01)
*F16D 3/30* (2006.01)

(52) U.S. Cl.
CPC ............ *F16D 3/845* (2013.01); *F16D 3/30* (2013.01); *F16D 2003/846* (2013.01); *Y10S 464/906* (2013.01)

(58) Field of Classification Search
CPC ...... F16D 3/845; F16D 3/30; F16D 2003/846; Y10S 464/906

USPC ............................................................ 464/17
See application file for complete search history.

(56) References Cited

U.S. PATENT DOCUMENTS

| 1,816,891 | A | * | 8/1931 | Boyden | ................... | F16D 3/848 |
| | | | | | | 464/171 |
| 9,790,996 | B2 | * | 10/2017 | Metzger | .................. | F16D 3/224 |

FOREIGN PATENT DOCUMENTS

SU 924442 * 4/1982 ...................... 464/17

\* cited by examiner

*Primary Examiner* — Greg Binda
(74) *Attorney, Agent, or Firm* — DICKINSON WRIGHT PLLC

(57) ABSTRACT

A drivetrain assembly for a motor vehicle including a venting system. The drivetrain assembly includes an output shaft from a vehicle prime moreover component such as a transmission or transaxle. The output shaft is coupled to a propeller shaft through a constant velocity joint (CVJ) assembly. A flexible sealing boot encloses the CVJ between the output shaft and the propeller shaft. Internal components of the CVJ are vented by a first longitudinal passageway exposed to the internal volume of the CVJ extending longitudinally along the output shaft. A second radial passageway joins the longitudinal passageway and extends to the radially outer surface of the output shaft forming a second aperture. The passageways combine to provide pressure equalization between the CVJ internal volume and the atmosphere. An optional semi-permeable membrane may be mounted at the second aperture.

4 Claims, 1 Drawing Sheet

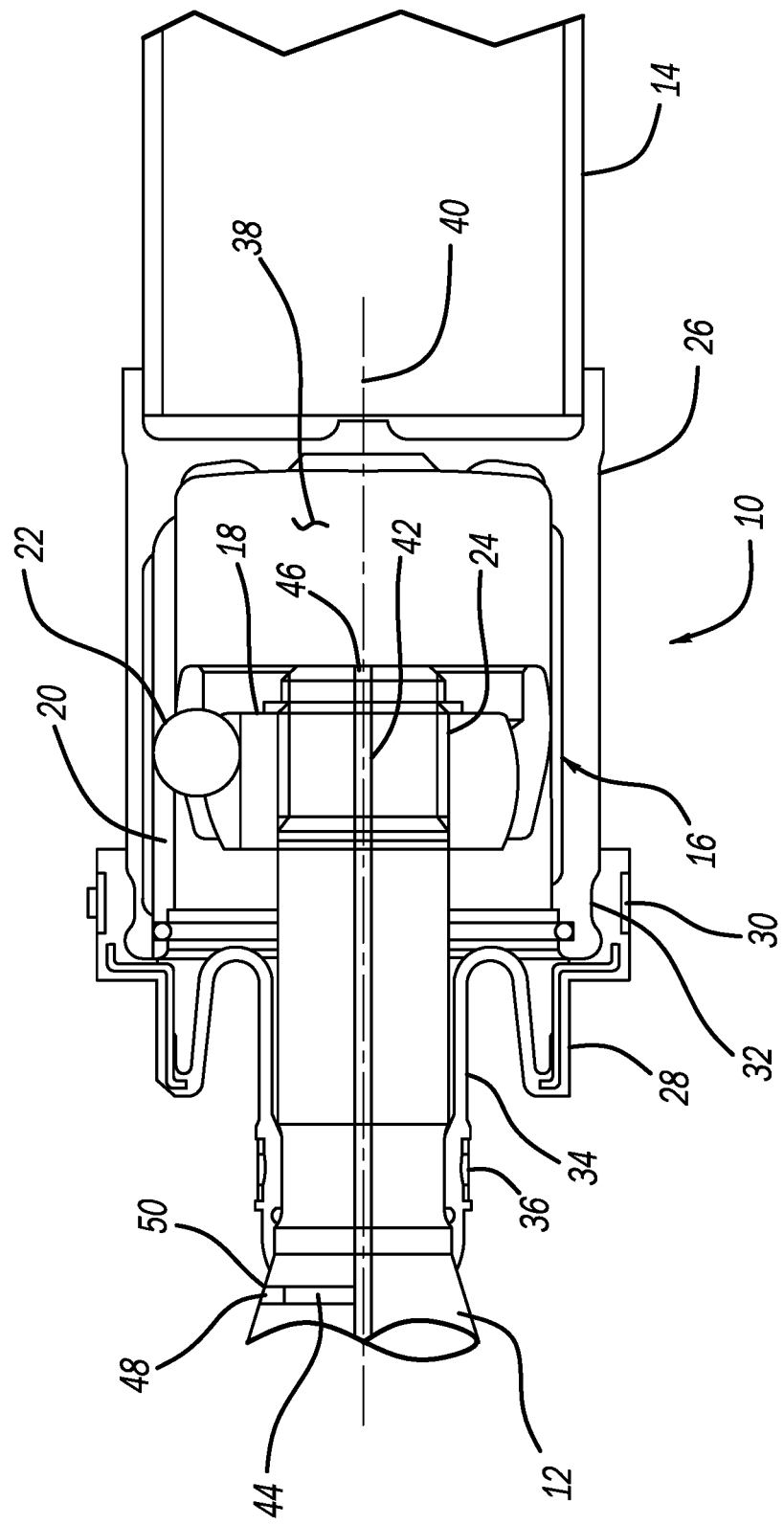

CENTER SHAFT VENTED CVJ

FIELD OF THE INVENTION

This invention relates to a motor vehicle powertrain component and in particular to a system for venting internal components of a drivetrain propeller shaft and a constant velocity joint (CVJ) of the drivetrain.

BACKGROUND

For motor vehicles having a prime mover in the form of an internal combustion engine (IC) or an electric motor, it is necessary to transmit torque via a propeller shaft or driveshaft to ground engaging wheels. For example, in a typical IC engine vehicle with a front mounted transverse engine, a transaxle is provided with individual drive half shafts connected with front drive wheels. CVJs are used in the drivetrain connected with the half shafts to allow steering and suspension movement of the wheels relative to the transaxle. CVJ's provide smooth rotary transmission of torque even where there is angular displacement between the drivetrain components connected with the CVJ. In another typical application of a front engine vehicle, the transmission is connected with a rear drive axle via a propeller shaft. Here also CVJ's are used between the transmission and propeller shaft to allow alignment flexibility in the drivetrain. CVJ's have internal bearing elements which require lubricating grease. In the operating environment of a motor vehicle, drivetrain components are exposed to varying temperatures and atmospheric pressure conditions. Also, the components are exposed to road dirt, mud and water. CJV internal bearing components are typically protected from the environment by elastic lip seals. In order to equalize air pressure inside and outside of the CVJ, a venting system is desired. Otherwise, pressure differences would cause a constant pumping in and out of the bearing space of the CVJ, leading to the ingestion of water and contaminants. Also a pressure differential would lead to a deformation of the lip seals, causing premature wear and increasing drag torque at the interface between the drivetrain component and the seal.

In view of the foregoing, there is a need to provide a venting system for equalizing pressure between internal components of a CVJ and the atmosphere. Typical prior art systems use a vent passage at the CVJ seal boot. These approaches have disadvantages of providing reliable venting.

SUMMARY OF THE INVENTION

In accordance with the present invention, a venting solution for a CVJ powertrain system is provided by venting through a center shaft via a tubular vent path along the center of the shaft. A radial vent passageway provides communication with the atmosphere. The venting port to atmosphere could be left open or protected by a semi permeable membrane. In addition to reducing the complexity of the design of the CVJ seal and boot, the system also provides a slinging effect due to the radial passageway and the rotational motion of the shaft, tending to expel contaminants from the vent passageway.

Although the invention is described as employed with a conventional IC engine vehicle drivetrain, it may find application in other types of vehicle propulsion systems including those powered by an electric motor coupled to road wheels via a flexible rotational coupling.

BRIEF DESCRIPTION OF THE DRAWINGS

FIG. 1 provides a view partially in elevation and partially in cross section showing internal components of a drivetrain assembly incorporating a venting system in accordance with the present invention.

DETAILED DESCRIPTION

With reference to FIG. 1, a drivetrain assembly 10 is shown incorporating a venting system in accordance with the present invention. Drivetrain assembly 10 includes output shaft 12 which extends from a vehicle transmission or transaxle (not shown) for providing propulsion for the associated vehicle. Propeller (prop) shaft 14 connects with output shaft 12 through CVJ (constant velocity joint) 16. At the distal end of output shaft 12, CVJ assembly 16 is provided. As mentioned previously, CVJ assembly 16 allows for an angular displacement between output shaft 12 and propeller shaft 14 during operation of the vehicle. CVJ assembly 16 includes a number of conventional elements including inner race 18, outer race 20 with rolling elements 22 therebetween. In this design of CJV 16, outer race 20 is part of an end casing 26 welded to prop shaft 14. CVJ assembly 16 further allows a limited range of telescoping motion to occur between output shaft 12 and propeller shaft 14, again accommodating the relative motion occurring during vehicle operation. The distal end 24 of output shaft 12 is splined and fits within mating splines of CVJ inner race 18 in order to transmit torque. A further detailed description of the operation the CVJ assembly 16 is not necessary for the disclosure of features of the present invention and is accordingly not provided here.

Flexible boot seal 28 is made from an elastomeric rubber-like material and formed in a corrugated manner and includes an outer mounting clamp 30 clamped to the outer surface of propeller shaft 14. Preferably, propeller shaft 14 features an annular groove 32 to allow secure attachment and retention of mounting clamp 30. The inside portion of boot seal 28 features center boot section 34 which is closely received by output shaft 12. Again to enhance retention, boot clamp 36 is provided to provide secure fixing to the output shaft 12.

CVJ end casing 26 is closed to define a closed volume 38 for retaining CVJ assembly 16. This closed volume 38 is partially filled with grease for lubrication of the internal components of CVJ assembly 16. A portion of the volume 38 also is atmospheric air. As discussed in the background portion of this disclosure, it is desired to vent gases in the enclosed volume 38 to atmosphere to prevent pressure imbalances from occurring which can lead to water ingestion and a pumping action, bringing dirt and other contaminants into the enclosed volume.

A principal feature of the current invention is the provision of the venting system for CVJ assembly 16. As illustrated in the FIGURE, a first longitudinal vent passageway 42 is provided aligned with the central longitudinal axis 40 of output shaft 12. One end of vent passageway 42 is exposed to enclosed volume 38 at aperture 46. A radial vent passageway 44 intersects vent passageway 42 and extends radially to the outer surface of output shaft 12 where it forms aperture 48 exposed to atmosphere. Aperture 48 is positioned to be outside of the portion of output shaft 12 enclosed by center boot section 34. Pressure imbalances between atmosphere and enclosed volume 38 are equalized by gas movement through vent passageway 42 and 44. Due to the orientation of radial vent passageway 44, rotation of output shaft 12 accelerates contaminants that may form within the vent passage to be expelled by a slinging action, helping to maintain opening of the passageways.

Output shaft 12 as described above is provided as a solid metal shaft and vent passageway 42 and 44 are formed by drilling operations. In another embodiment of the present invention, one or both of the vent passageways 42 and 44 could be formed by separate tube elements passing through output shaft 12 in the form of a hollow tube.

In another alternative implementation of the present invention, aperture 48 could be partially enclosed by a semi permeable membrane 50 which serves as an additional barrier to the ingestion of contaminants into the vent passageway 42 and 44.

While the above description constitutes the preferred embodiment of the present invention, it will be appreciated that the invention is susceptible to modification, variation and change without departing from the proper scope and fair meaning of the accompanying claims.

The invention claimed is:

1. A drivetrain assembly for a motor vehicle comprising,
   an output shaft,
   a propeller shaft having an end fitting affixed to a distal end of the propeller shaft,
   a constant velocity joint interposed between the output shaft and the propeller shaft for allowing torque to be transferred between the output shaft and the propeller shaft and allowing at least a limited degree of angular and longitudinal relative displacement between the output shaft and the propeller shaft, the output shaft forming splines meshing with mating splines of an inner race of the constant velocity joint,
   a sealing boot affixed to the output shaft and the end fitting for sealing and protecting internal components of the constant velocity joint, the sealing boot, the end fitting, and the output shaft forming an enclosed volume,
   a venting system for the constant velocity joint including a first generally longitudinal passageway formed within the output shaft extending from a distal end of the output shaft forming a first aperture and a second generally radial passageway formed within the output shaft joining and extending from the first passageway to a radially outer surface of the output shaft forming a second aperture, whereby the enclosed volume is vented to atmosphere by the first passageway and the second passageway, the second aperture positioned along the output shaft displaced from the sealing boot.

2. The drivetrain assembly in accordance with claim 1 further comprising, a semi permeable membrane positioned in the second aperture.

3. The drivetrain assembly in accordance with claim 1 further comprising, the first passageway is aligned generally with the longitudinal axis of the output shaft.

4. The drivetrain assembly in accordance with claim 1 further comprising, wherein the sealing boot is affixed to outer annular surfaces of the output shaft and the end fitting.

* * * * *